US007487327B1

(12) United States Patent
Chang et al.

(10) Patent No.: US 7,487,327 B1
(45) Date of Patent: Feb. 3, 2009

(54) PROCESSOR AND METHOD FOR DEVICE-SPECIFIC MEMORY ADDRESS TRANSLATION

(75) Inventors: Bruce J. Chang, Saratoga, CA (US); Ricky C. Hetherington, Pleasanton, CA (US); Brian J. McGee, San Jose, CA (US); David M. Kahn, Makawao, HI (US); Ashley N. Saulsbury, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 314 days.

(21) Appl. No.: 11/144,117

(22) Filed: Jun. 1, 2005

(51) Int. Cl.
*G06F 12/00* (2006.01)
(52) U.S. Cl. .................... 711/203; 710/3; 711/154
(58) Field of Classification Search .................. 711/203
See application file for complete search history.

(56) References Cited

U.S. PATENT DOCUMENTS

| 4,680,700 | A * | 7/1987 | Hester et al. ............... 711/206 |
| 4,930,069 | A | 5/1990 | Batra et al. |
| 5,887,146 | A | 3/1999 | Baxter et al. |
| 6,105,110 | A | 8/2000 | Watkins |
| 6,173,349 | B1 | 1/2001 | Qureshi et al. |
| 6,725,289 | B1 * | 4/2004 | Waldspurger et al. .......... 710/9 |
| 6,971,048 | B1 | 11/2005 | Hanson et al. |
| 7,111,145 | B1 * | 9/2006 | Chen et al. .................. 711/206 |
| 7,249,241 | B1 | 7/2007 | Chu et al. |
| 2001/0044889 | A1 * | 11/2001 | James et al. ................ 711/206 |
| 2002/0069328 | A1 * | 6/2002 | Chauvel ...................... 711/130 |
| 2002/0152335 | A1 * | 10/2002 | Holm et al. ...................... 710/8 |
| 2004/0236876 | A1 * | 11/2004 | Kondratiev et al. ........... 710/22 |
| 2005/0091121 | A1 | 4/2005 | Charney et al. |
| 2006/0010276 | A1 | 1/2006 | Arndt et al. |
| 2006/0069899 | A1 | 3/2006 | Schoinas et al. |
| 2006/0075146 | A1 | 4/2006 | Schoinas et al. |
| 2006/0195642 | A1 | 8/2006 | Arndt et al. |

OTHER PUBLICATIONS

Microsoft Computer Dictionary, Microsoft Press, Redmond, WA, copyright 2002 by Microsoft Corporation.*

* cited by examiner

*Primary Examiner*—Kevin L Ellis
*Assistant Examiner*—Matthew Bradley
(74) *Attorney, Agent, or Firm*—Robert C Kowert; Anthony M. Petro; Meyertons, Hood, Kivlin, Kowert & Goetzel, P.C.

(57) ABSTRACT

A processor employing device-specific memory address translation. In one embodiment, a processor may include a device interface configured to receive a memory access request from an input/output (I/O) device, where the request specifies a virtual memory address and a first requestor identifier (ID) that identifies the I/O device. The processor may also include an I/O memory management unit coupled to the device interface and configured to determine whether a virtual-to-physical memory address translation corresponding to the virtual memory address is stored within an I/O memory translation buffer. The I/O memory management unit may be further configured to determine whether a second requestor ID stored within the I/O memory translation buffer and corresponding to the memory address translation matches the first requestor ID. If the first and second requestor IDs do not match, the I/O memory management unit may disallow the memory access request and to signal an error condition.

36 Claims, 12 Drawing Sheets

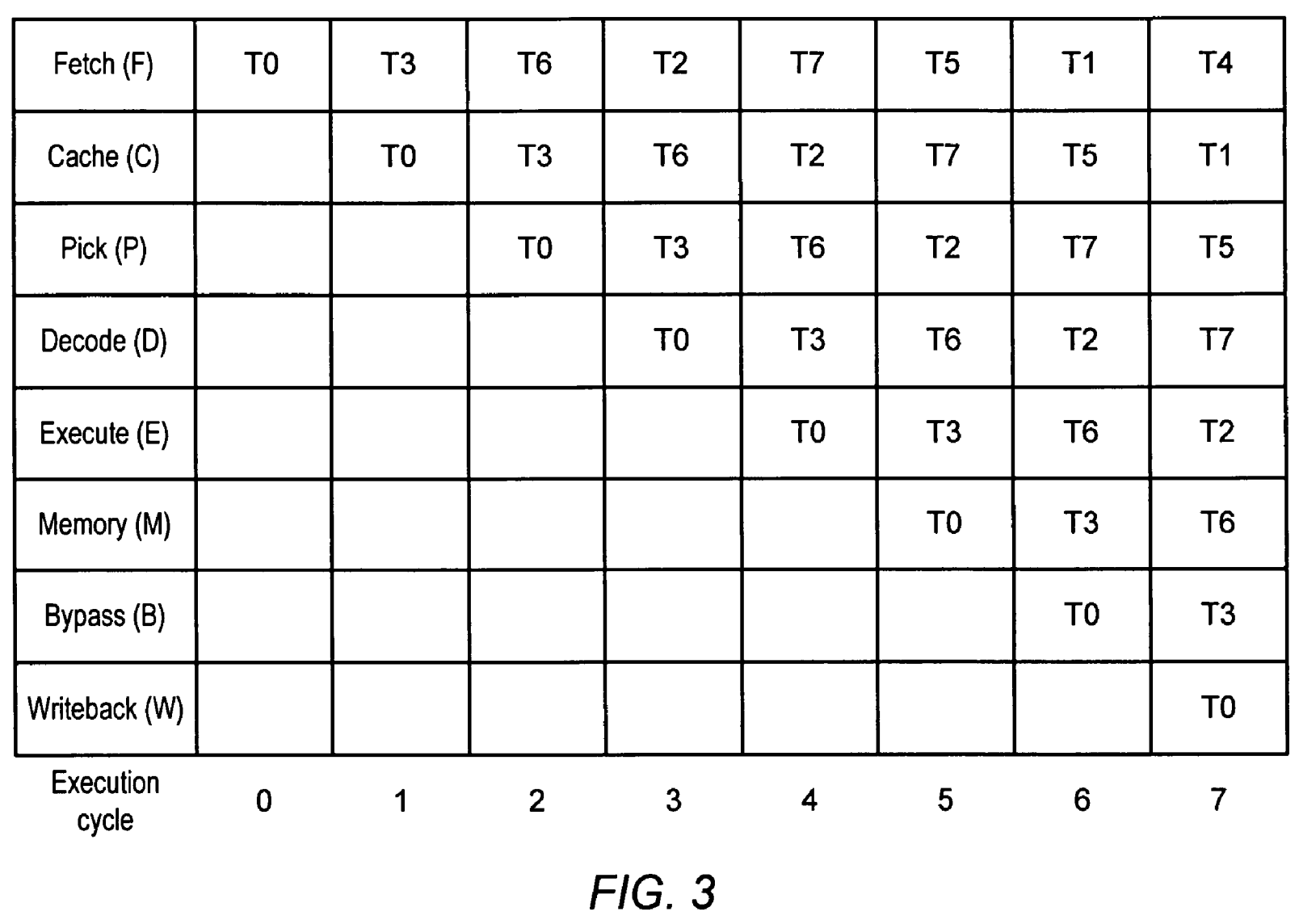

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

FIG. 3

PROCESSOR AND METHOD FOR DEVICE-SPECIFIC MEMORY ADDRESS TRANSLATION

BACKGROUND OF THE INVENTION

1. Field of the Invention

This invention relates to processors, and more particularly, to techniques for securing virtual memory address translations within a processor.

2. Description of the Related Art

Many computer systems include, among other components, a processor for processing data and performing various functions, some type of system memory for storing data being processed by the processor, and one or more peripheral devices that may serve as sources and/or destinations for data, such as mass storage devices. Often, large quantities of data may need to be transferred from a peripheral device to system memory or vice versa. Rather than having the processor coordinate the details of such a transfer, in some system embodiments a direct transfer (also referred to as a direct memory access (DMA) transfer) between the peripheral device and the system memory be may supported. In a DMA transfer, a peripheral device may autonomously generate requests to access system memory without intervention on the part of the processor, thus potentially freeing the processor to perform other tasks.

In some embodiments, the processor may support a virtual memory system in which the memory address space made available to software applications (e.g., a virtual memory address space) is a distinct address space from the memory address space used to address system memory (e.g., a physical memory address space). In such a virtual memory system, a correspondence or translation may be established between a given virtual address and a given physical address. During system operation, a request to access system memory that specifies a virtual memory address may be converted into a request that specifies a physical memory address through use of an established translation.

Peripheral devices involved in DMA transfers to system memory may specify virtual memory addresses that may require translation to physical addresses before the corresponding data being transferred is presented to system memory. In some embodiments, many different peripheral devices may be capable of generating virtually-addressed memory requests requiring translation. However, if translation information is made globally available to a number of different peripheral devices, system security and/or stability may be compromised. For example, an errant or malicious peripheral device may incorrectly or improperly generate requests to access or modify data stored at a virtual address, and such requests may otherwise be indistinguishable from legitimate requests. As a result, critical data may be corrupted or compromised, which may result in incorrect system operation, data theft, or other adverse consequences.

SUMMARY

A processor employing device-specific memory address translation is disclosed. In one embodiment, a processor may include a device interface configured to receive a memory access request from an input/output (I/O) device, where the memory access request specifies a virtual memory address to be accessed and a first requestor identifier (ID) that identifies the I/O device. The processor may also include an I/O memory management unit coupled to the device interface and configured to determine whether a virtual-to-physical memory address translation corresponding to the virtual memory address is stored within an I/O memory translation buffer. The I/O memory management unit may be further configured to determine whether a second requestor ID stored within the I/O memory translation buffer and corresponding to the memory address translation matches the first requestor ID specified in the memory access request. If the second requestor ID does not match the first requestor ID, the I/O memory management unit may be configured to disallow the memory access request and to signal an error condition.

In one specific implementation of the processor, the device interface may be compliant with a version of the Peripheral Component Interconnect (PCI) or PCI Express standards. In another specific implementation of the processor, each of the requestor IDs may include a PCI bus number, a PCI device identifier, and a PCI function number.

A method is further contemplated that in one embodiment includes receiving a memory access request from an input/output (I/O) device, wherein the memory access request specifies a virtual memory address to be accessed and a first requester identifier (ID) that identifies the I/O device, and determining whether a virtual-to-physical memory address translation corresponding to the virtual memory address is stored within an I/O memory translation buffer. The method may further include determining whether a second requestor ID stored within the I/O memory translation buffer and corresponding to the memory address translation matches the first requestor ID specified in the memory access request, and if the second requestor ID does not match the first requester ID, disallowing the memory access request and signaling an error condition.

BRIEF DESCRIPTION OF THE DRAWINGS

Other aspects of the invention will become apparent upon reading the following detailed description and upon reference to the accompanying drawings in which:

FIG. 3 is a pipeline diagram illustrating the flow of instructions through one embodiment of a processor core.

Figure 1:
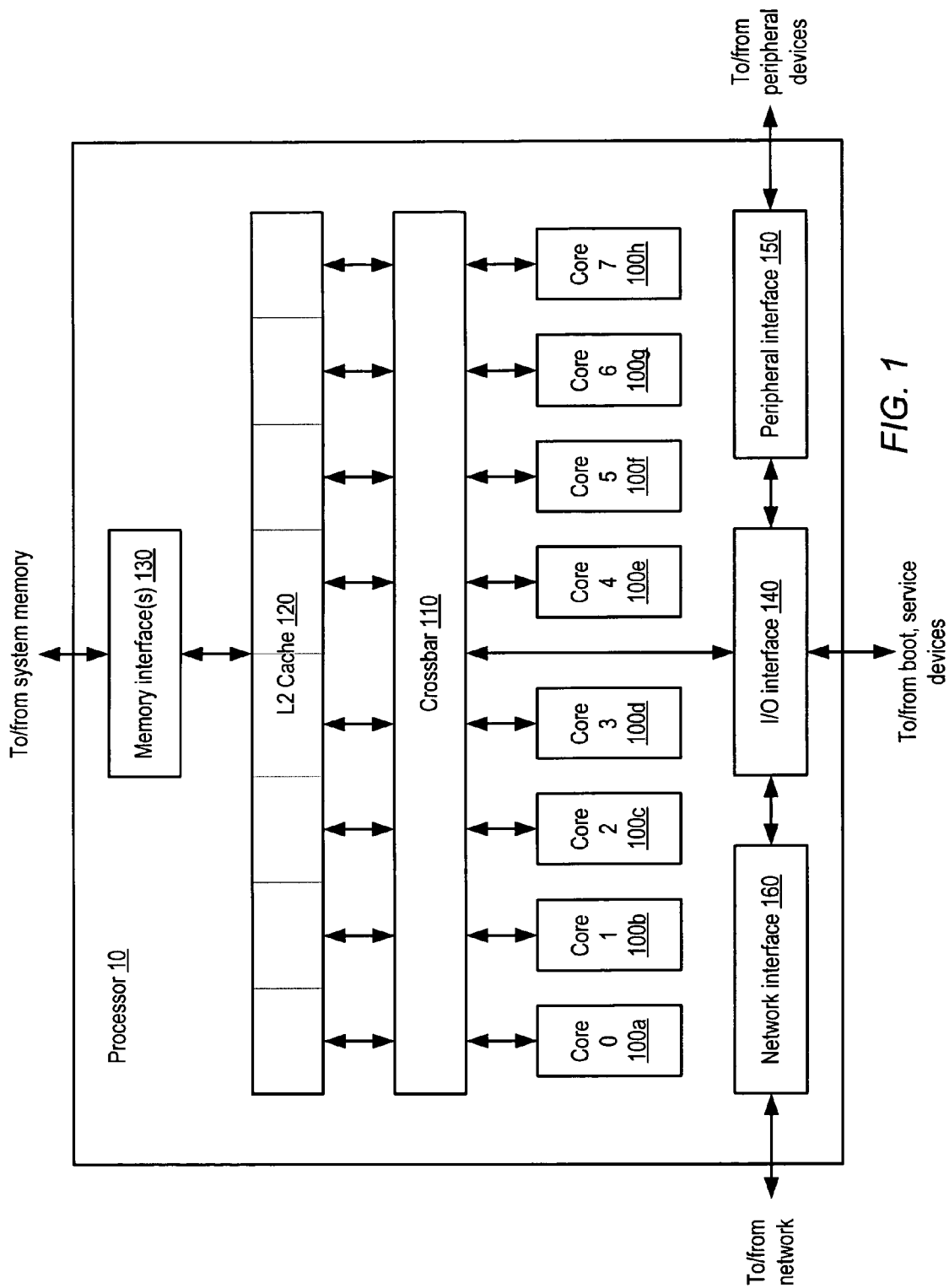
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Overview of multithreaded processor architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
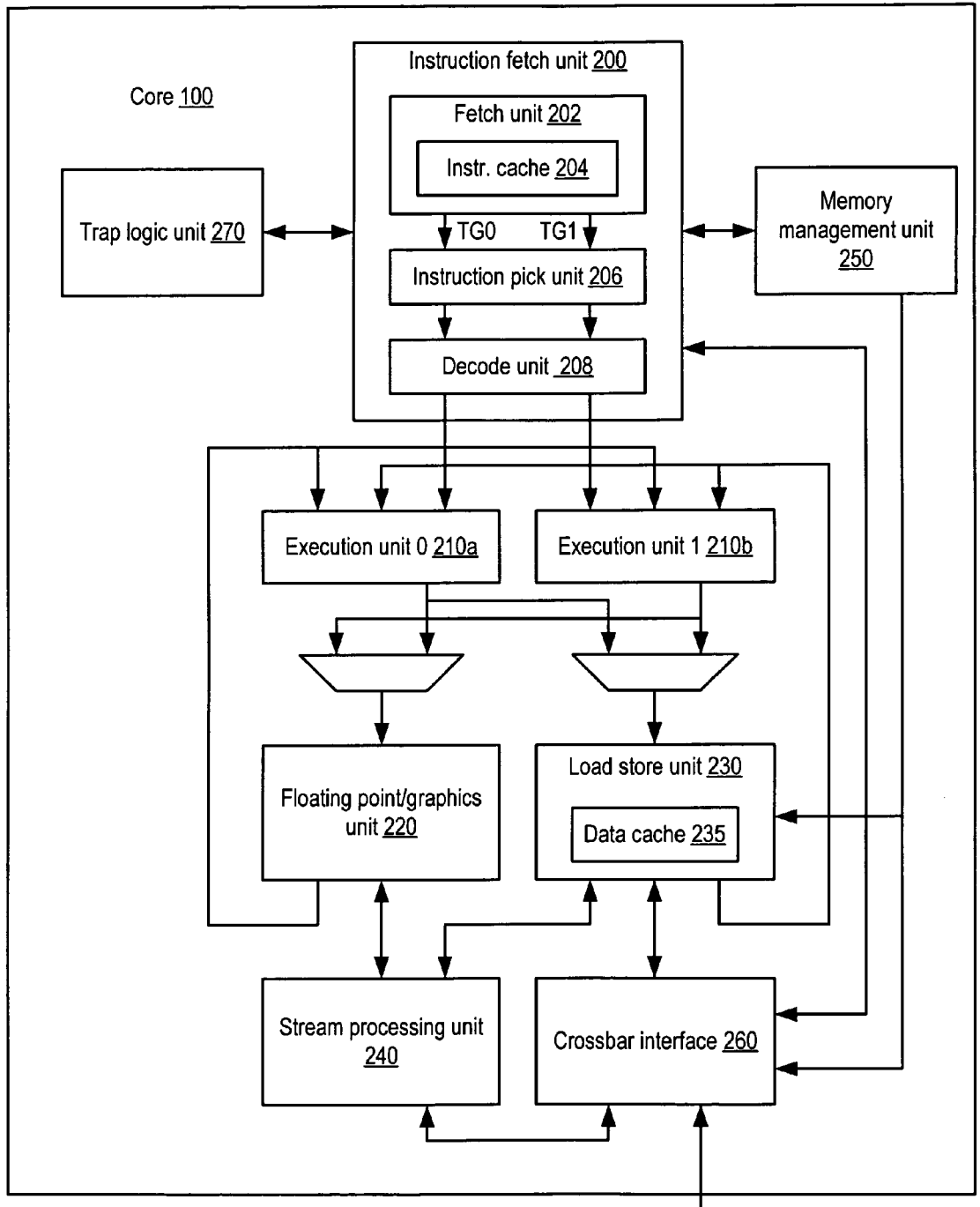
FIG. 2 is a block diagram illustrating one embodiment of a processor core.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic sub-units independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has results that are ready to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Input/Output Devices and Memory Address Translation

Referring once again to FIG. 1, as described above, in some embodiments processor 10 may be configured to interact with peripheral or I/O devices via I/O interface 140 and peripheral interface 150. For example, individual threads executing on particular cores 100 may interact with mass storage devices (e.g., optical or magnetic disk drives, nonvolatile memory-based storage devices, etc.), graphics display devices, input devices (e.g., image scanners, audio or video capture devices, etc.) or other types of I/O devices via a PCI- or PCI-Express-compliant interface implemented by peripheral interface 150.

Often, the interaction of processor 10 with a particular I/O device involves transfer of potentially large amounts of data. For example, a user application such as a database application executing under a particular thread on a particular core 100 may regularly read, data sets on the order of multiple megabytes or gigabytes from disk storage, modify them, and write them back to disk storage. Similarly, an operating system executing on a core 100 may include support for a paged virtual memory system that regularly exchanges pages of data stored in physical memory (e.g., RAM) for pages of data stored on disk and vice versa. Many other examples of mass data transfer between processor 10 and various I/O devices via I/O interface 140 and peripheral interface 150 are possible and contemplated.

In some embodiments, an I/O transaction (e.g., reading or writing of data) with an I/O device may be directly controlled by software executing on a given thread of a given core 100. For example, an application thread could individually control the movement of bytes or words of data between memory and the I/O device, such as by executing individual operating system I/O calls for each data element moved. However, this method of data transfer may be extremely inefficient for moving large quantities of contiguous data. Consequently, in some embodiments I/O interface 140 and peripheral interface 150 may support direct memory access (DMA) data transfers between I/O devices and system memory. Generally speaking, once a DMA transfer of data to or from an I/O device has been initiated, the transfer may occur with minimal or no interaction on the part of software executing on cores 100. For example, in one embodiment, software (e.g., a user or supervisor-level process) may initiate a DMA transfer by executing a system call that specifies a source and destination for the transfer (e.g., from an I/O device to a region of a memory address space, or vice versa) as well as a starting location and quantity of data to be transferred. In response to the system call, operating system software may program DMA control hardware within I/O interface 140 and/or peripheral interface 150 to perform the transfer. Once the transfer is complete, or if an error occurs during the transfer, the DMA control hardware may signal the requesting software process, for example by causing a DMA signaling interrupt to be posted to the thread corresponding to the requesting process. Numerous other variations and implementations of DMA transfers are possible, and it is intended that the term "DMA transfer" encompass all such suitable variants.

In addition to DMA transfers, in some embodiments processor 10 may support virtual memory techniques. Generally speaking, support for virtual memory includes the provision of at least two distinct memory address spaces: a virtual memory address space and a physical memory address space, as well as support for establishing a correspondence between virtual and physical addresses. Typically, physical memory addresses are allocated to physical system memory, such as RAM, while virtual memory addresses are allocated to software processes. In some embodiments, as described in greater detail below, processor 10 may include one or more memory management units (MMUs) configured to translate a given virtual address into a corresponding physical address. It is noted that in some embodiments, virtual memory systems may include more than two distinct address spaces, and correspondingly more than a single translation may be necessary to determine a physical memory address that corresponds to an address used by software.

Virtual memory techniques generally provide a degree of indirection between virtual addresses presented to software and physical addresses representative of physical memory. Such indirection may enable more efficient, flexible or robust use of physical memory resources within a system. For example, in some embodiments virtual memory features of processor 10 may be configured to support swapping of pages or segments of the virtual address space into or out of the physical address space (also referred to as paged virtual memory or simply paging). In one embodiment of paging, the virtual address space and physical address space may be divided into multiple portions or pages, which may be of equal or different sizes. A given software process, thread or other entity may be allocated pages within the virtual address space. The hardware and software memory management features of processor 10 may then establish a correspondence between virtual pages and pages within the physical address space. If, for example, a software entity becomes idle, some or all of its virtual pages may be removed from physical memory and stored elsewhere (e.g., to a mass storage device accessible via peripheral interface 150) in a process that may be referred to as paging out or swapping out. By swapping out pages from physical memory that correspond to idle software, physical memory resources may be freed to store pages corresponding to active software.

Correspondingly, when a software entity needs to access virtual pages that are not resident in physical memory (i.e., that have been swapped out), the relevant pages may be reloaded from, e.g., a mass storage device. It is noted that upon being reloaded after having been swapped out, a virtual page need not be restored to the same physical page to which it previously corresponded. In some embodiments, the correspondence between virtual and physical memory addresses may be maintained by processor 10 in a manner that is transparent to the software entity utilizing the virtual addresses. That is, in some embodiments, software may have no awareness of the details of how its address space relates to physical memory, or that physical memory exists at all. Such transparency may in some instances enable operating system software and/or hardware memory management features to optimize the use of physical memory for different system configurations or operational states (e.g., execution workloads) without necessitating modifications to software.

In embodiments of processor 10 that support both DMA and virtual memory, software entities that request DMA transfers may not be able to specify a specific location within physical memory to or from which the transfer should occur, owing to the transparency of physical memory details to software as just described. In some such embodiments, software may request DMA transfers using virtual addresses to specify the source or destination for the transfer, and support for translating virtual addresses to appropriate physical addresses may be included within the DMA transfer path between the I/O device and physical memory.

Figure 4:
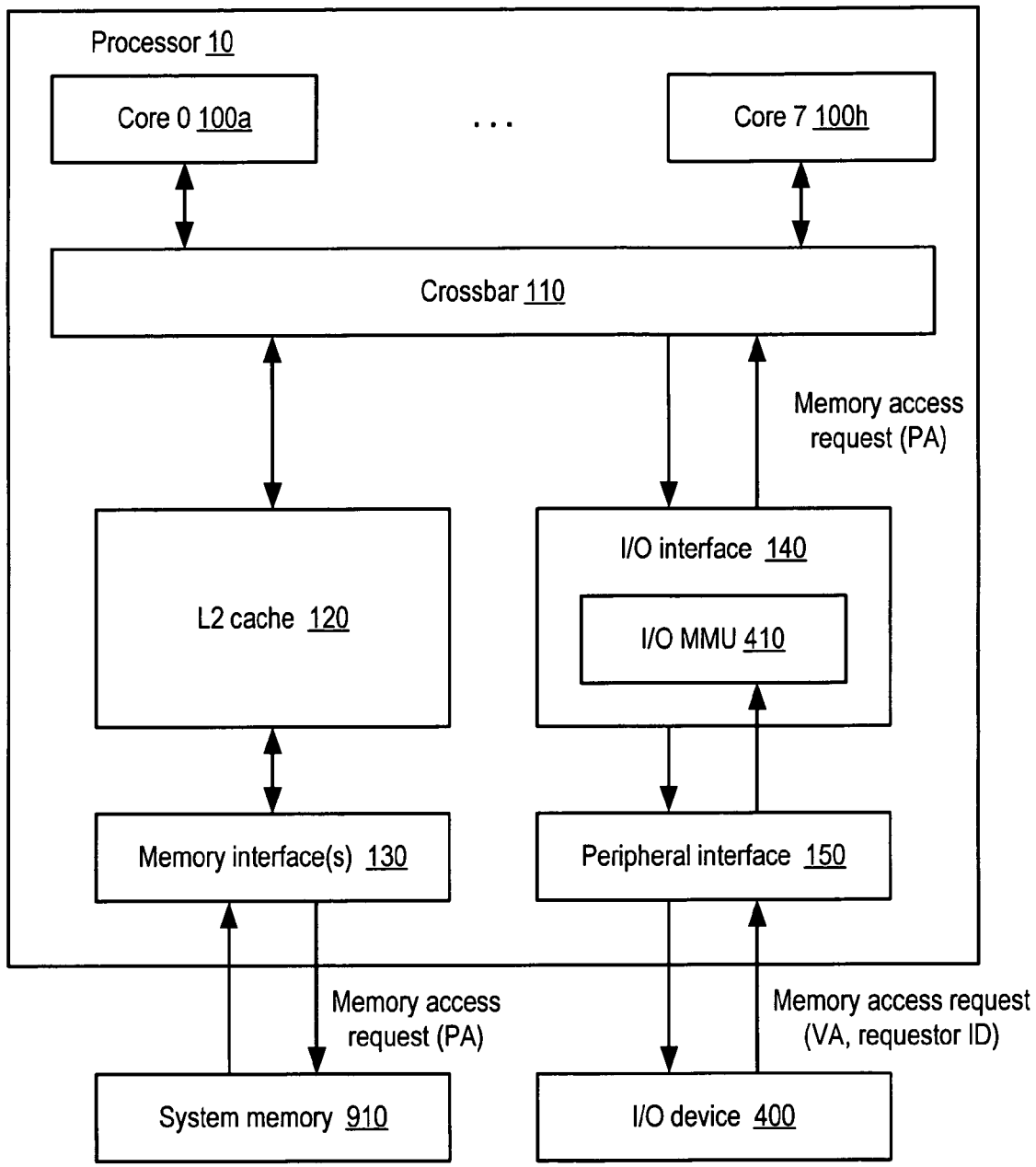
FIG. 4 is a block diagram illustrating a portion of one embodiment of a processor core including a virtually-addressed DMA interface to I/O devices.

A portion of one embodiment of processor 10 that includes a virtually-addressed DMA interface to I/O devices is illustrated in FIG. 4. In the illustrated embodiment, a number of elements of processor 10 shown in FIG. 1 have been omitted for clarity, although it is understood that the embodiment shown in FIG. 4 may include those elements or other elements. In the illustrated embodiment, cores 100*a-h*, L2 cache 120 and I/O interface 140 are shown coupled to crossbar 110. L2 cache 120 is coupled to memory interface(s) 130, which are in turn configured for coupling to a system memory 910 that may be external to processor 10. Also, I/O interface 140 is coupled to peripheral interface 150, which is in turn configured for coupling to an I/O device 400 external to processor 10.

Broadly speaking, system memory 910 may include any suitable type of system memory that memory interface(s) 130 may be configured to support as described above, such as FB-DIMM, DDR/DDR2 SDRAM, or RDRAM®, for example. System memory 910 may include multiple discrete banks of memory controlled by discrete memory interfaces in embodiments of processor 10 configured to provide multiple memory interfaces 130. Also, in some embodiments system memory 910 may include multiple different types of memory. System memory 910 may also be referred to as physical memory in the context of virtual memory techniques.

I/O device 400 may generally correspond to any suitable type of device that may be supported by peripheral interface 150. For example, in various embodiments I/O device 400 may include a mass storage device such as a disk drive or solid-state drive, a data capture device such as a still image scanner, a video or audio capture device, or an instrumentation bus device such as a general-purpose interface bus (GPIB) device, an output device such as a printer, etc. Depending on the specific interface(s) supported by peripheral interface 150, I/O device 400 may be compliant with a version of the PCI, PCI-X PCI-Express (PCI-E) interfaces, the USB interface (e.g., USB 1.1, USB 2.0), the Integrated Drive Electronics/AT Attachment Packet Interface (IDE/ATAPI), or the IEEE 1394 interface. In some embodiments, peripheral interface 150 may support wireless interface standards such as Bluetooth or IEEE 802.11 ("Wi-Fi"), and I/O device 400 may accordingly be compliant with a suitable wireless interface standard.

In the illustrated embodiment, processor 10 may be configured to provide a path for DMA transfers between I/O device 400 and system memory 910. Generally speaking, once a DMA transfer from I/O device 400 into system memory 910 has been initiated (e.g., at the request of software executing on one of cores 100), the path for DMA data flow begins with I/O device 400, which may be configured to send DMA data to peripheral interface 150 along with a request to access system memory 910 in order to store the DMA data. It is noted that in various embodiments, hardware control (also referred to as DMA master control) over the DMA transfer may be performed within I/O interface 140, peripheral interface 150, I/O device 400, or a combination of these. That is, in one embodiment, I/O device 400 may be configured as an autonomous DMA master capable of initiating DMA transactions in support of a DMA transfer, while in other embodiments, I/O device 400 may passively respond to read or write requests initiated by I/O interface 140 or peripheral interface 150 in support of a DMA transfer. In the latter case, either I/O interface 140 or peripheral interface 150 may be configured as a DMA master.

Data received from I/O device 400 by peripheral interface 150 may be conveyed to I/O interface 140. The data may correspond to a destination specified by a virtual memory address, e.g. a virtual address specified by software when the DMA transfer was initiated, or a virtual address determined by a DMA master as a temporary destination for data before data is moved or copied into the address space of the requesting software. As described above, virtual memory addresses may require translation into physical memory addresses in order to access system memory 910. In the illustrated embodiment, I/O interface 140 includes an I/O memory management unit (IOMMU) 410 configured to perform virtual-to-physical memory address translation. For example, IOMMU 410 may be configured to determine what physical memory pages currently located within system memory 910 store data that corresponds to virtual memory pages required by the DMA transfer. In one embodiment, IOMMU 410 may be configured to manage a set of hierarchical page translation tables stored in system memory 910, on a mass storage I/O device 400, or elsewhere, and may be configured to traverse the translation tables to determine the identity of the physical memory page that corresponds to a given virtual memory page (and in some embodiments, the reverse translation from a given physical page to possibly several virtual memory pages).

Following translation by IOMMU 410, the memory access request (now specifying a physical rather than virtual address) may proceed to system memory 910 via crossbar 110, L2 cache 120 and memory interface(s) 130. It is noted that in some embodiments, accesses to system memory 910 may bypass L2 cache 120. Further, in some embodiments I/O interface 140 may support a direct connection with memory interface(s) 130 instead of or in addition to its interface with crossbar 110.

In some instances, physical memory pages corresponding to virtual memory pages required by a given DMA transfer may not be resident within system memory 910 (e.g., the pages may have been swapped out to disk). Correspondingly, in some embodiments IOMMU 410 may be configured to load the appropriate virtual pages into corresponding physical memory pages of system memory 910, or to cause software executing on one of cores 100 to load the missing virtual memory pages (e.g., by causing a page fault trap or interrupt to be signaled to the thread that requested the DMA transfer or on whose behalf the transfer is being performed).

In some embodiments, the translation tables maintained by IOMMU 410 may be complex, including multiple levels of hierarchy. In such embodiments, determining a virtual-to-physical memory address translation for a given virtual memory address by traversing the translation tables may require several accesses to data structures containing the tables, which may result in adding substantial latency to the memory access request that requires the translation. Thus, in some embodiments, IOMMU 410 may be configured to store a certain number of virtual-to-physical memory address translations within a cache, buffer or other data storage unit such that if a translation is present within the storage unit, it may be unnecessary to consult the translation tables to obtain the translation. Such a storage unit may be variously referred to as a translation lookaside buffer (TLB), a translation table entry (TTE) cache, or a memory translation buffer.

A TTE cache embodiment may be implemented using content addressable memory (CAM). One such embodiment may employ physical and virtual memory pages that may both be of the same size, such that a fixed number of least significant bits of either a virtual or physical memory address specifies an offset within a corresponding virtual or physical memory page. The remaining most significant bits of the virtual and physical addresses may then respectively identify particular unique virtual and physical memory pages, and may be respectively referred to as Virtual Page Numbers (VPNs) and Physical Page Numbers (PPNs). The conventional TTE cache may include a number of CAM entries that specify individual VPNs and the PPNs that correspond to them according to a particular virtual-to-physical address translation. Thus, for a given virtual address, if the VPN specified by the given address matches the VPN stored in a specific valid TTE cache entry (also referred to as a TTE cache "hit"), the PPN also stored in that entry may be used to form a physical address, e.g., by concatenating the bits of the virtual memory address specifying the offset into the page with the PPN. Thus, if a given virtual address hits in the TTE cache, a corresponding physical address may be obtained without reference to translation tables.

However, such an embodiment presents a potential security and/or stability risk for a system based on processor 10. Specifically, in the aforementioned TTE cache embodiment, any I/O device 400 that initiates a memory access request to a given virtual address may be allowed to access the corresponding physical page if a valid translation exists within the TTE cache, regardless of whether such an access occurs in response to a desired or requested transaction such as a legitimate DMA transfer. For example, an I/O device 400 may fail in such a way that it generates spurious memory access requests with random data. Alternatively, a malicious I/O device 400 may attempt to generate memory access requests that attempt to deliberately modify or corrupt memory pages, for example to compromise sensitive data or program execution. In either case, if a valid translation for the erroneous or malicious memory access request exists within the TTE cache, the memory access request may be allowed to proceed to system memory 910 and to corrupt various physical memory pages. Such corruption may lead to deleterious consequences such as erroneous system operation, a system crash, or data loss or theft, for example.

Figure 5:
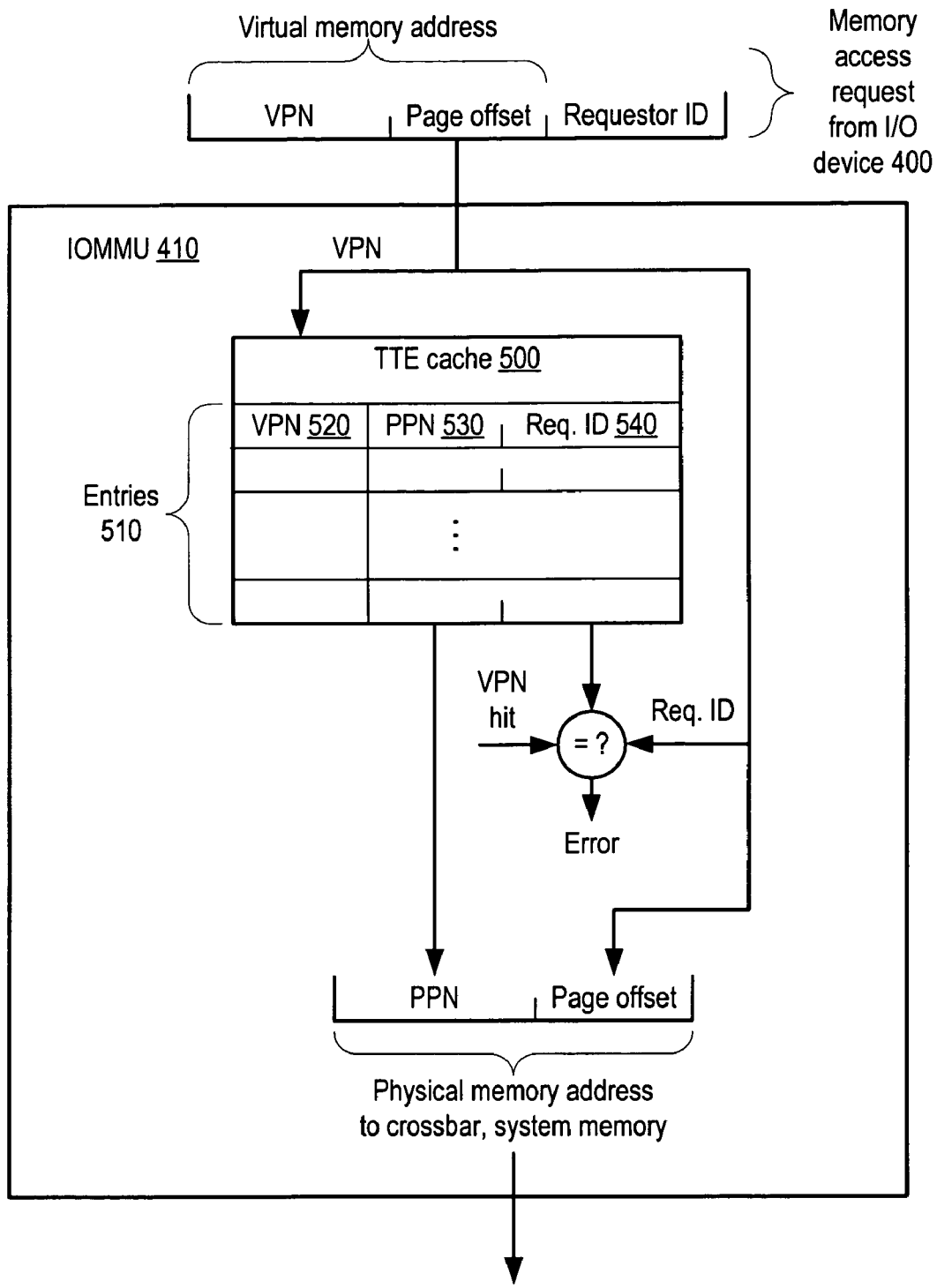
FIG. 5 is a block diagram illustrating one embodiment of an I/O memory management unit in which access to cached virtual-to-physical memory address translations may be restricted on the basis of requestor identifiers.

FIG. 5 illustrates one embodiment of IOMMU 410 in which access to cached virtual-to-physical memory address translations may be restricted on the basis of requester identifiers, which may reduce the security and stability risks identified above. In the illustrated embodiment, IOMMU 410 includes a TTE cache 500, which may be configured to store virtual-to-physical memory translations. In the illustrated embodiment, TTE cache 500 includes a number of entries 510, each of which includes a number of fields including a virtual page number (VPN) field 520, a physical page number (PPN) field 530 and a requestor identifier (ID) field 540.

In the illustrated embodiment, TTE cache 500 may be implemented as a CAM that may be uniquely indexed by the VPN field 520 of entries 510. For example, as described in greater detail below in conjunction with the description of FIG. 6, TTE cache 500 may be accessed by comparing a given input VPN with the value stored in the VPN field 520 of each entry 510 (e.g., in parallel or sequentially). If a match or hit exists, the corresponding entry 510 may be selected for further operation. In one embodiment, TTE cache 500 may be implemented as a unified CAM structure. In another embodiment, the index portion of TTE cache 500 (e.g., VPN field 520) may be implemented as a separate data structure from the portion of TTE cache 500 that does not participate in the cache hit determination. Such separation may allow respective portions of TTE cache 500 to be optimized according to their functional characteristics, for example. It is noted that in other embodiments, TTE cache 500 need not be implemented as a CAM, and may instead employ other suitable data structures, such as random access buffers, conventional direct-mapped or set-associative caches, or hashed data structures, for example.

A given entry 510 of TTE cache 500 may correspond to a particular virtual-to-physical memory address translation or mapping. In the illustrated embodiment, translations occur at a page level of granularity, and a given entry 510 maps a virtual page referenced by VPN field 520 to a physical page referenced by PPN field 530. However, in other embodiments TTE cache 500 may be used in non-page-based virtual memory systems, or in virtual memory schemes that concurrently support multiple different page sizes or variable-length pages. In some embodiments, entries 510 may include additional fields, such as a valid bit indicating that the entry is valid, history or least-recently-used bits used to select entries 510 for replacement, or other additional fields.

The requestor ID field 540 of a given entry 510 may be configured to store an identifier of an I/O device 400 to which the translation represented by given entry 510 corresponds. In one embodiment, a requestor ID for a given I/O device 400 may be formed as a concatenation of several data values defined by peripheral interface 150 that are specific to the given I/O device 400. For example, a peripheral interface 150 that is PCI or PCI-Express compliant may support a certain number of physical or logical interface buses, each identified by a unique bus number. Such an interface 150 may also support a certain number of uniquely identified devices per bus, and a certain number of uniquely identified functions per device. For example, a given device may integrate several distinct functions, such as audio and graphics functions, which may be treated as distinct I/O devices 400 even though implemented within a single physical entity attached to a peripheral bus.

In one such embodiment, a unique combination of a PCI bus number, device number and a function number may be assigned to each I/O device 400 present within a system, for example at system reset by software or by hardware within peripheral interface 150. Each such combination may be considered the requestor ID for a corresponding I/O device 400. However, in other embodiments, a requestor ID corresponding to an I/O device 400 may be determined in a different manner and/or may include different data fields. For example, embodiments of peripheral interface 150 that are compliant with other interface architectures (e.g., USB and others described above) may employ a different hierarchy for identifying I/O devices 400. Additionally, in some embodiments, I/O devices 400 may be guaranteed to be uniquely identified by virtue of hardcoded serial numbers or other identifiers. In such embodiments, such hardcoded identifiers may be used as requestor IDs in place of a software-assigned identifier.

Generally speaking, a memory access request originating from an I/O device 400 may include the device's requestor ID as well as a memory address corresponding to the request. In some embodiments, both the address and the requester ID may be communicated within a single request packet, while in other embodiments these fields may be communicated separately according to the conventions of peripheral interface 150.

Figure 6:
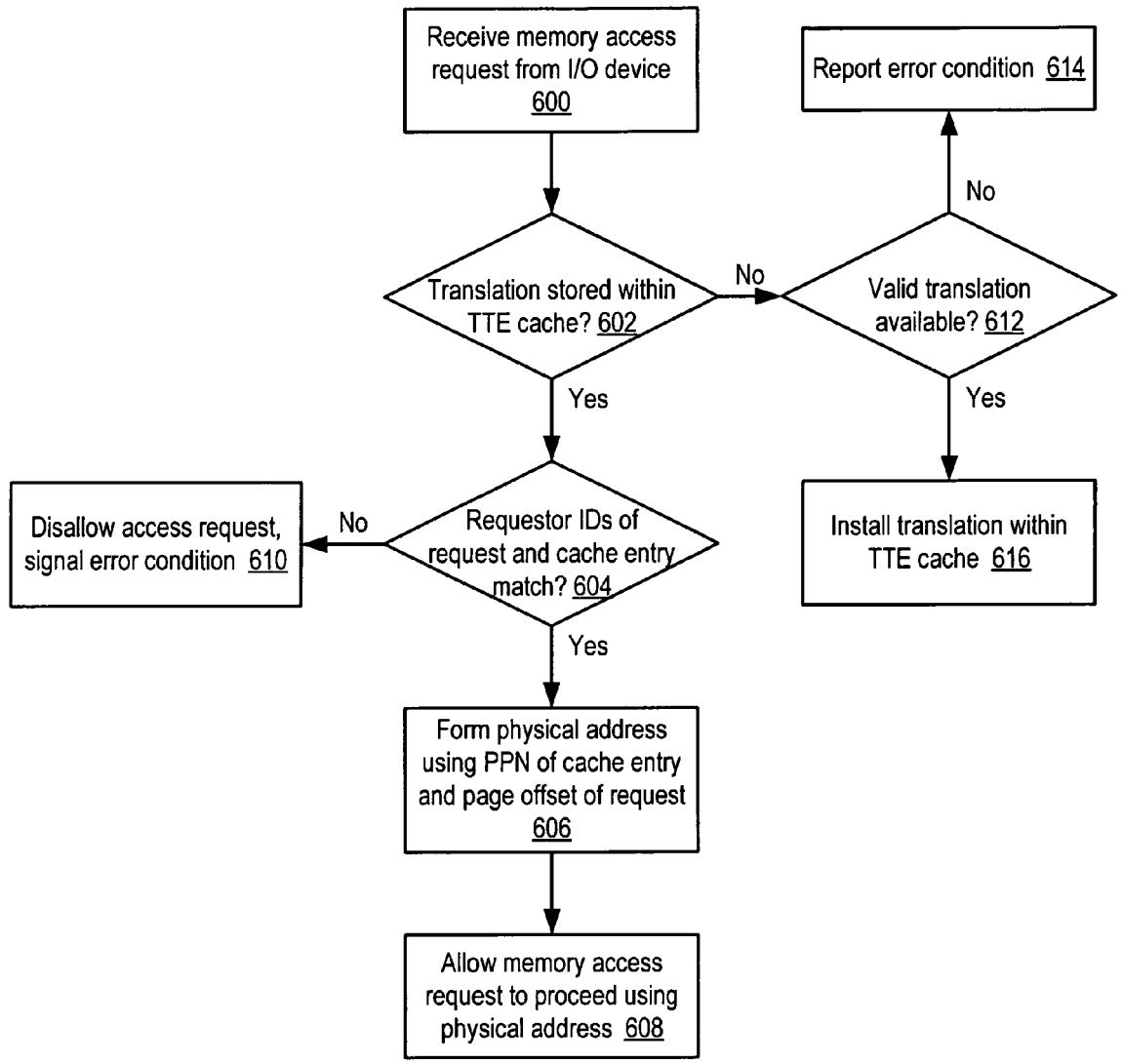
FIG. 6 is a flow diagram illustrating one embodiment of a method of operation of an I/O memory management unit.

One embodiment of a method of operation of IOMMU 410 and TTE cache 500 is illustrated in FIG. 6. Referring collectively to FIGS. 1-6, operation begins in block 600 where a memory access request is received from a given I/O device 400. For example, I/O interface 140 may receive such an access request from given I/O device 400 via peripheral interface 150 during a DMA transfer from given I/O device 400 to system memory 910. As shown in FIG. 5, in one embodiment the memory access request includes a requestor ID corresponding to the given I/O device 400 virtual memory address that includes a VPN and a page offset.

TTE cache 500 is then checked to determine whether a virtual-to-physical memory address translation corresponding to the virtual address included in the memory access request is stored within the cache (block 602). For example, in one embodiment the VPN of the request may be compared against the VPN field 520 of each of entries 510 in parallel. If an entry 510 matches or hits the VPN of the request, a translation may exist. In some embodiments, the comparison may be qualified using additional information, such as a valid bit of an entry 510. For example, an invalid entry 510 may never cause a hit regardless of the data contained in its VPN field 520. If more than one entry 510 happens to match the VPN of a request, it may be ambiguous as to which entry corresponds to the translation to be used. Consequently, in some embodiments TTE cache 500 may be configured to signal an error if more than one entry 510 matches any given request.

If a translation is present within TTE cache 500, the requestor ID field 540 included in the entry 510 associated with the translation is compared against the requester ID field included within the memory access request to determine whether there is a match (block 604). If so, a physical memory address for the memory access request is formed using the PPN field 530 of the entry 510 associated with the translation and the page offset indicated in the memory access request (block 606). The memory access is then allowed to proceed using the physical memory address (block 608).

If there is a mismatch between the compared requestor ID values, the I/O device 400 corresponding to the memory access request may be different from the I/O device 400 associated with the translation. In this case, the memory access request is disallowed and an error condition is signaled (block 610). For example, in one embodiment the memory access request may be silently discarded or an abort indication may be sent to the requesting I/O device 400, depending on whether the requesting device expects a response to its request. Additionally, IOMMU 410 may be configured to signal an error condition via a trap or interrupt to the thread of the core 100 associated with either the requesting I/O device 400 or the violated entry 510. Alternatively, IOMMU 410 may log the occurrence of the error for later communication to software.

If no translation is present within TTE cache 500, IOMMU 410 may be configured to attempt to obtain a valid translation for the VPN of the memory access request (block 612). If a valid translation cannot be obtained, an error may be reported (block 614). For example, in one embodiment IOMMU 410 may initiate a software or hardware translation table walk in order to determine if a valid translation exists within the translation tables. If no valid translation exists, a translation table entry may be created, e.g., by selecting a PPN corresponding to a free physical page and storing the PPN within an appropriate translation table. In some embodiments, the requester ID of the I/O device 400 corresponding to the memory access request may be included within the created translation table entry. Also, in some embodiments, other criteria (e.g., based in the requestor ID) may be applied before a translation table entry is created. In embodiments where requester IDs are included in translation table entries, if a valid translation table entry corresponding to the VPN of the memory access request exists, but the requester ID of the entry does not match the requestor ID of the requesting I/O device 400, an error may be reported and the request may be disallowed in a manner similar to that described above.

If a valid translation for the VPN of the memory access request is obtained, the obtained translation may be installed within TTE cache 500 (block 616). For example, if a free entry 510 exists (e.g., an entry 510 that does not already store a valid translation), the obtained translation may be stored within the free entry 510. Otherwise, an entry 510 may be selected to be replaced with the obtained translation according to a suitable algorithm, such as a least-recently-used (LRU) or least-frequently-used (LFU) algorithm.

As just described, by associating a particular requestor ID with a given translation stored within TTE cache 500 and comparing a stored requestor ID corresponding to a translation with the requestor ID of a requesting I/O device 400, in one embodiment access by I/O devices 400 to translations may be made contingent upon requestor IDs. Such restricted access may prevent faulty or malicious devices 400 from randomly or deliberately modifying physical memory pages to which they do not already have access.

In the embodiment of TTE cache 500 shown in FIG. 5, comparison of requestor ID values may be performed after a matching entry 510 has already been selected. In an alternative embodiment, such as that shown in FIG. 7, the requester ID field may be included as part of the TTE cache hit determination, rather than subsequent to the hit determination. In the illustrated embodiment, IOMMU 410 includes a TTE cache 700, which like TTE cache 500 may be configured to store virtual-to-physical memory translations. In the illustrated embodiment, TTE cache 700 includes a number of entries 710, each of which includes a number of fields including a virtual page number (VPN) field 720, a physical page number (PPN) field 730 and a requestor identifier (ID) field 740.

In one embodiment, each of the fields of entries 710 may be representative of corresponding fields 510 of TTE cache 500 described above, in terms of the significance of the fields and their potential variations and alternatives. However, TTE cache 500 and TTE cache 700 may differ in the manner in which fields of their respective entries are used during respective cache accesses. Specifically, in the embodiment of FIG. 7, whether a given entry 710 qualifies as a hit or match for a given memory access request depends on both the VPN field 720 and requester ID field 740 of the given entry 710 respectively matching the VPN and requestor ID of the memory access request. By contrast, selection of a given entry 510 for further processing in TTE cache 500 is conditioned only by VPN field 520.

Figure 7:
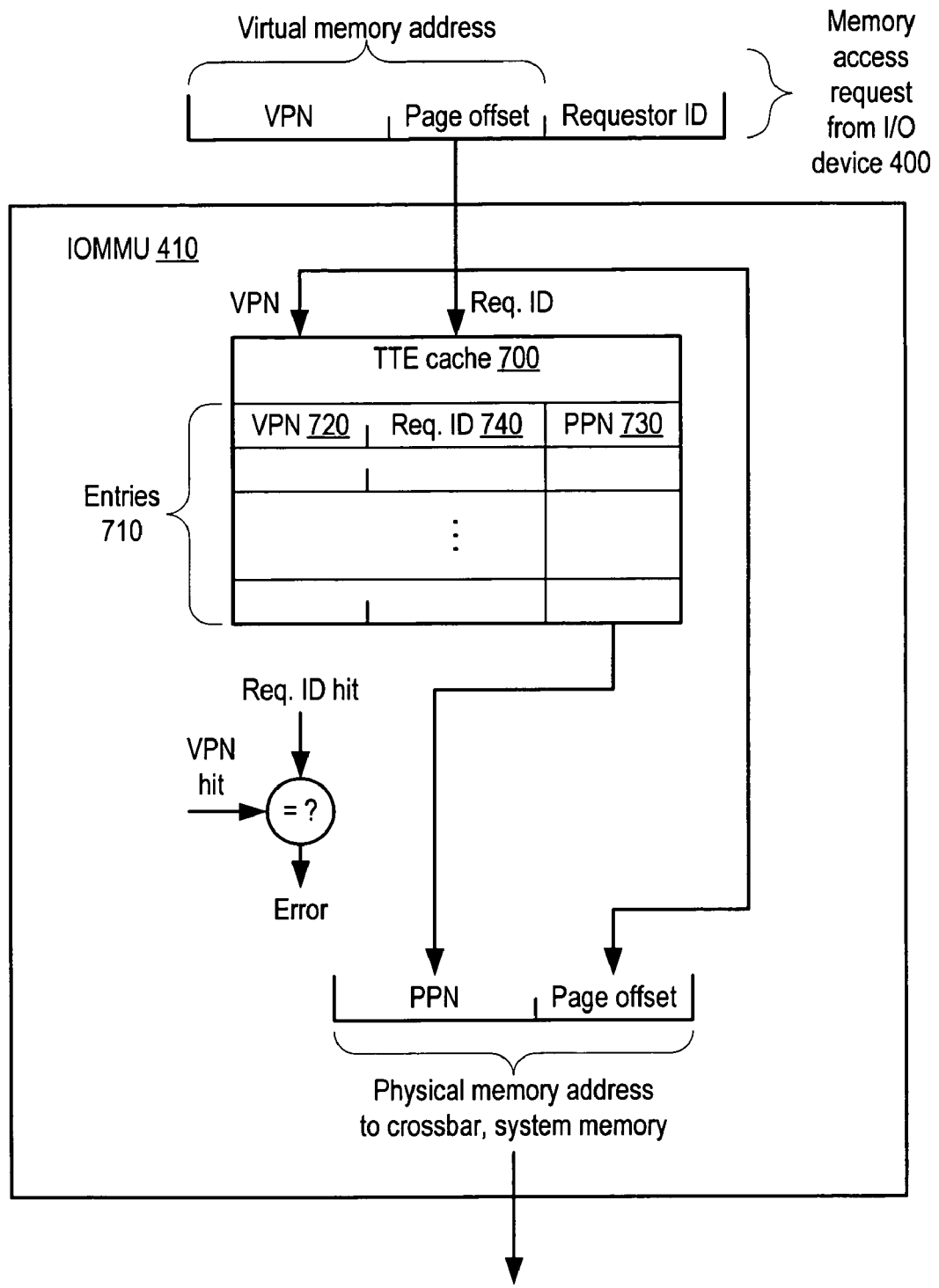
FIG. 7 is a block diagram illustrating another embodiment of an I/O memory management unit in which access to cached virtual-to-physical memory address translations may be restricted on the basis of requester identifiers.
Figure 8:
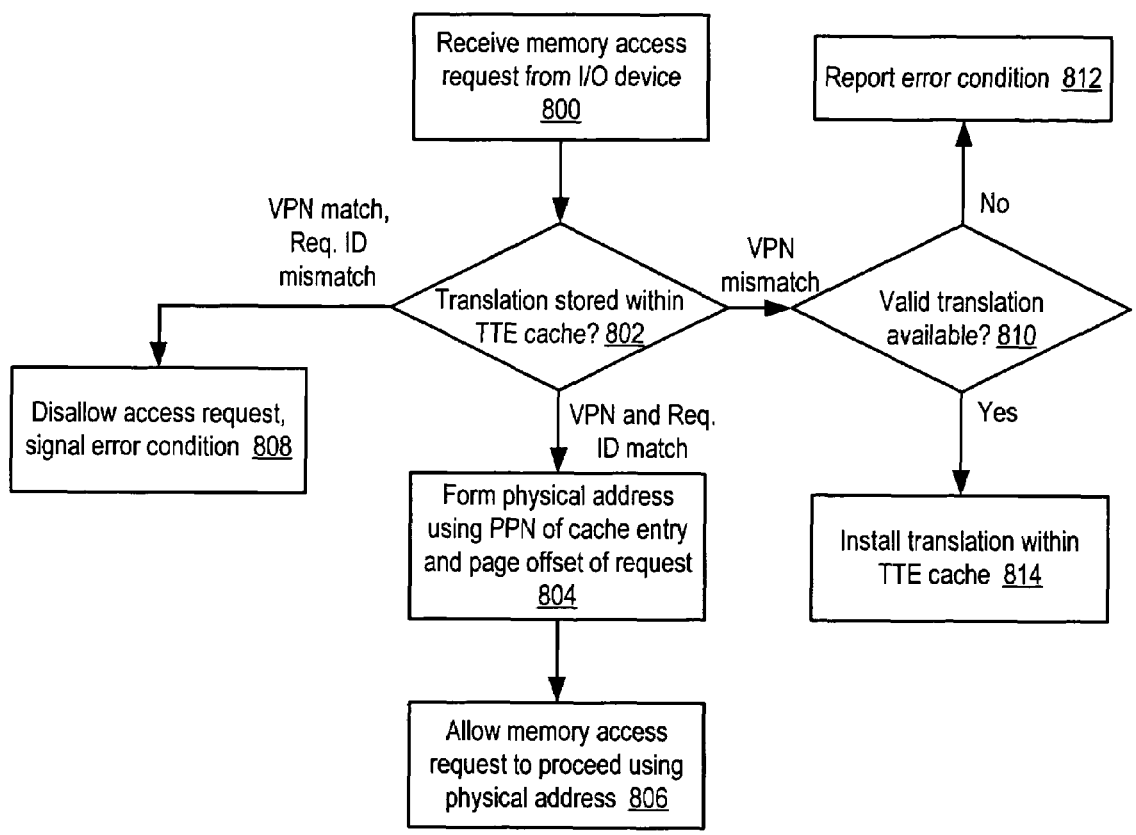
FIG. 8 is a flow diagram illustrating another embodiment of a method of operation of an I/O memory management unit.

One embodiment of a method of operation of IOMMU 410 and TTE cache 700 is illustrated in FIG. 8. Referring collectively to FIGS. 1-7, operation begins in block 800 where a memory access request is received from a given I/O device 400. Such a request may be received during the course of a DMA transfer between given I/O device 400 and system memory 910, as described previously. As shown in FIG. 7, in one embodiment the memory access request includes a requestor ID corresponding to the given I/O device 400 virtual memory address that includes a VPN and a page offset.

TTE cache 700 is then checked to determine whether a virtual-to-physical memory address translation corresponding to the VPN and the requestor ID included in the memory access request is stored within the cache (block 802). For example, in one embodiment the VPN and requestor ID of the request may be respectively compared against the VPN field 720 and requestor ID field 740 of each of entries 710 in parallel. If an entry 710 matches or hits both the VPN and the requestor ID of the request, a translation may exist. As for TTE cache 500 described above, in some embodiments, the comparison may be qualified using additional information, such as a valid bit of an entry 710. Further, if more than one entry 710 matches a given request, an error condition may occur in some embodiments.

If both the VPN field 720 and the requestor ID field 740 of a given entry 710 match the VPN and requestor ID of the memory access request, a physical memory address for the memory access request is formed using the PPN field 730 of the entry 710 associated with the translation and the page offset indicated in the memory access request (block 804). The memory access is then allowed to proceed using the physical memory address (block 806).

If the VPN field 720 of a given entry 710 matches the VPN of the memory access request but there is a mismatch between the compared requestor ID values, the I/O device 400 corresponding to the memory access request may be different from the I/O device 400 associated with the translation. In this case, the memory access request is disallowed and an error condition is signaled (block 808). For example, in one embodiment the memory access request may be silently discarded or an abort indication may be sent to the requesting I/O device 400, depending on whether the requesting device expects a response to its request. Additionally, IOMMU 410 may be configured to signal an error condition via a trap or interrupt to the thread of the core 100 associated with either the requesting I/O device 400 or the violated entry 710. Alternatively, IOMMU 410 may log the occurrence of the error for later communication to software.

If the VPN of the memory access request does not match the VPN field 720 of any entry 710, no translation may be present within TTE cache 700, and IOMMU 410 may be configured to attempt to obtain a valid translation for the VPN of the memory access request (block 810). If a valid translation cannot be obtained, an error may be reported (block 812). For example, in one embodiment IOMMU 410 may initiate a software or hardware translation table walk in order to determine if a valid translation exists within the translation tables, in a manner similar to that described above for FIG. 6.

If a valid translation for the VPN of the memory access request is obtained, the obtained translation may be installed within TTE cache 700 (block 814). For example, if a free entry 710 exists (e.g., an entry 710 that does not already store a valid translation), the obtained translation may be stored within the free entry 710. Otherwise, an entry 710 may be selected to be replaced with the obtained translation according to a suitable algorithm, such as a least-recently-used or least-frequently-used algorithm.

It is noted that, like TTE cache 500, the inclusion of requestor IDs in TTE cache 700 may prevent undesired accesses to memory translations by requiring a requester ID correspondence between a translation and an I/O device 400 requesting access to memory. In TTE cache 500, requestor ID checking is not performed until after a hit condition occurs for a particular entry 510, in which case usage statistics (e.g., LRU or LFU statistics) for entries 510 may be updated even if the hit condition is ultimately disallowed because of a requestor ID mismatch. In some instances, allowing usage statistics to be updated for disallowed accesses may reduce the overall performance of TTE cache 500. For example, a large number of invalid access requests to some entries 510 may cause other entries 510 to become more prone to replacement, thus forcing a translation table walk if an otherwise valid access request subsequently occurs to an entry 510 that has been replaced. However, in the illustrated embodiment of TTE cache 700, a hit condition does not occur unless there is both a VPN and requestor ID match for a particular entry 710. Consequently, usage statistics for TTE cache 700 may more closely reflect allowable memory access request activity, which may in turn improve performance. Additionally, by including the requestor ID as part of the lookup of TTE cache 700, in some embodiments the latency of obtaining the translation may be reduced relative to checking the requestor ID following TTE cache access, as in the case of TTE cache 500.

In some embodiments, software may provide a unique virtual address space in which devices 400 may specify requests. In some such embodiments, it may be desirable to allow more than one device 400, but fewer than all devices 400 to access a translation for a particular VPN. Generally speaking, embodiments of either TTE cache 500 or TTE cache 700 may support this scenario with minor operational modifications. Specifically, if more than one device 400 may access a particular VPN, more than one requestor ID may be valid for that particular VPN. In one embodiment, each entry 510 of TTE cache 500, or each entry 710 of TTE cache 700, may be configured to store N different multiple requestor IDs 540 or 740, one for each of N possible devices 400 that may match the VPN field 520 or 720 of the entry. In such an embodiment, if any of the stored requestor IDs 540 or 740 matches the requestor ID of the requesting device 400, the corresponding entry may be considered to match with respect to requester ID.

In an alternative embodiment of TUE cache 700, each of several devices 400 that seek to access a particular VPN may be assigned corresponding translations including their respective requester IDs, and individual translations may be installed within TTE cache 700 as necessary. In such an embodiment, it may be possible for all, some or none of the valid translations for a particular VPN to reside within TTE cache 700. If all valid translations reside within TTE cache 700, one entry 710 of TTE cache may hit for the particular VPN and requestor ID, while the remaining entries 710 of the other resident translations may mismatch on requestor ID. In such an embodiment, the entry 710 that hits may take priority over the entries 710 that mismatch on requestor ID. However, in the absence of an entry 710 that matches on both the VPN and requester ID fields, the presence of an entry 710 that matches on the VPN field and mismatches on the requester ID field may not necessarily indicate an error, as a valid translation for the supplied requestor ID may exist but not be present within TTE cache 700. Correspondingly, in one such embodiment, disallowing a memory access request and signaling an error condition in the event of a requestor ID mismatch may be further dependent upon determining whether a valid translation exists for the supplied requestor ID. For example, in one embodiment, the error condition may be held in abeyance until a table walk or other inquiry verifies whether a valid, uncached translation exists, discarded if such a valid translation does exist, and otherwise signaled.

Support for Multiple Virtual Address Spaces

In some embodiments, IOMMU 410 may support multiple distinct virtual address spaces, with virtual-to-physical address translation occurring separately for each virtual address space. For example, in one embodiment, each of several devices 400 may be associated with a respective virtual address space, such that the same VPN may be translated differently depending upon which device 400 requests it. That is, in such an embodiment, a given VPN translated with respect to one virtual address space may correspond to a different PPN than when translated with respect to another virtual address space. In some such embodiments, it may not be possible to distinguish the address space to which a given VPN belongs from the VPN itself. Consequently, if a TTE cache were to be accessed on the basis of VPN, then without additional information on the address space to which a VPN belongs, it may be ambiguous as to whether a given cache entry correctly corresponds to a given request to a VPN. For example, two devices 400 may request access to the same VPN within their respective address spaces, which may each specify entirely distinct translations to PPNs.

Generally speaking, a given TTE may reside within a translation table that may be stored within physical memory. In embodiments where multiple virtual address spaces are supported, multiple distinct translation tables corresponding respectively to the address spaces may be stored within physical memory. Thus, TTEs that reside within different translation tables may have different physical memory addresses. In some embodiments of TTE cache 500 or 700, the physical address of a given TTE (also referred to as a TTE PA) may be used in place of the VPN field to determine whether a given translation is cached. The TTE PA may be generated in a manner that incorporates the distinctions among different virtual address spaces, as described below. Consequently, in some embodiments the TTE PA may be used to unambiguously identify and select particular TTE cache entries.

Figure 9:
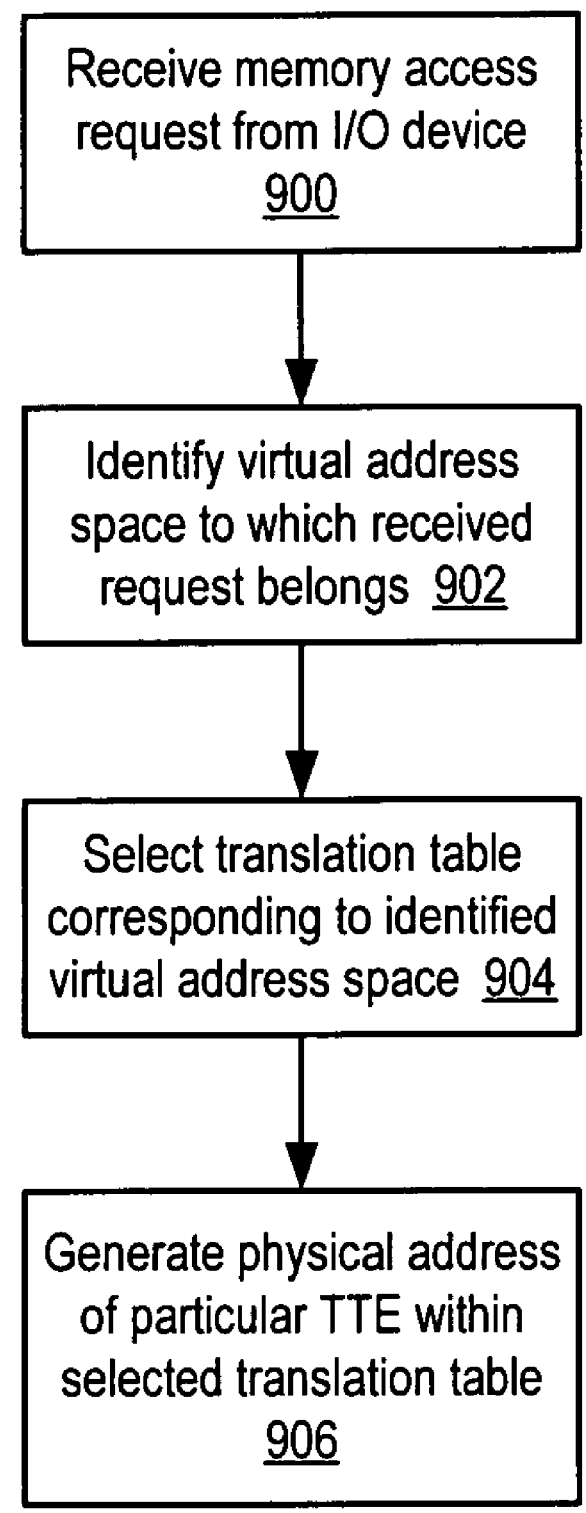
FIG. 9 is a flow diagram illustrating one embodiment of a method of determining a translation table entry physical address for a virtual address corresponding to one of several virtual address spaces.

One embodiment of a method of determining a TTE PA corresponding to a particular VPN that corresponds to one of several distinct virtual address spaces is illustrated in FIG. 9. Operation begins in block 900 where a memory access request is received, for example from one of devices 400. Subsequently, a particular virtual address space to which the received request belongs may be identified (block 902). In some embodiments, a virtual address space identifier may be derived from information about the device 400 and/or information within the VPN of the request itself. For example, in one embodiment an 8-bit virtual address space identifier for a request may be obtained from the combination of the most significant bit of the VPN in the request as well as the least significant seven bits of the bus number of the device 400 generating the request. However, in other embodiments it is contemplated that other combinations of bits from different sources may be used to determine a virtual address space identifier.

A particular translation table corresponding to the identified virtual address space may then be selected (block 904). In one embodiment, the virtual address space identifier may be used to select a particular translation table descriptor from among a set of such descriptors. Each descriptor may include an indication of the base or beginning location of each translation table within physical memory. In some embodiments, one or more additional levels of indirection or mapping may be provided between generation of a virtual address space identifier and selection of a particular translation table.

The physical address corresponding to a particular TTE within the selected translation table may then be generated (block 906). In one embodiment, the VPN of the access request may be hashed, adjusted with respect to a translation offset value, or subjected to another type of transformation, and the resultant transformed VPN may then be used as an index into the selected translation table to identify a physical address of a corresponding TTE.

It is noted that navigation of translation tables to identify particular TTEs may be highly dependent upon the specific translation table implementation. For example, in various embodiments of IOMMU 410, either hierarchical or flat translation tables may be employed, and the number of steps required to obtain a translation may vary accordingly. It is contemplated that the method just described may be varied to correspond to any suitable translation table embodiment.

Figure 10A:
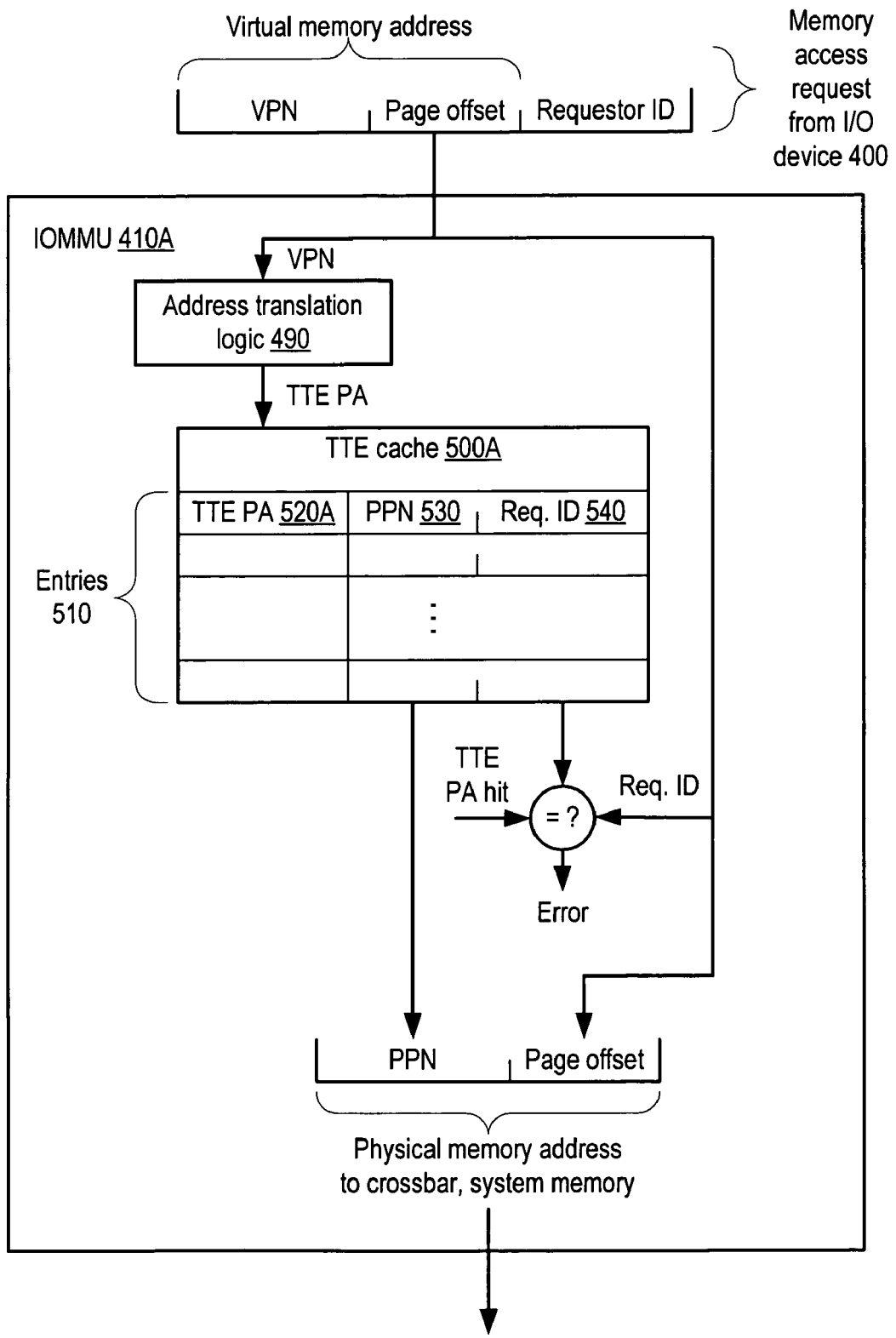
FIGS. 10A and 10B are block diagrams illustrating embodiments of I/O memory management units in which cached memory translations may be accessed on the basis of translation table entry physical addresses.
Figure 10B:
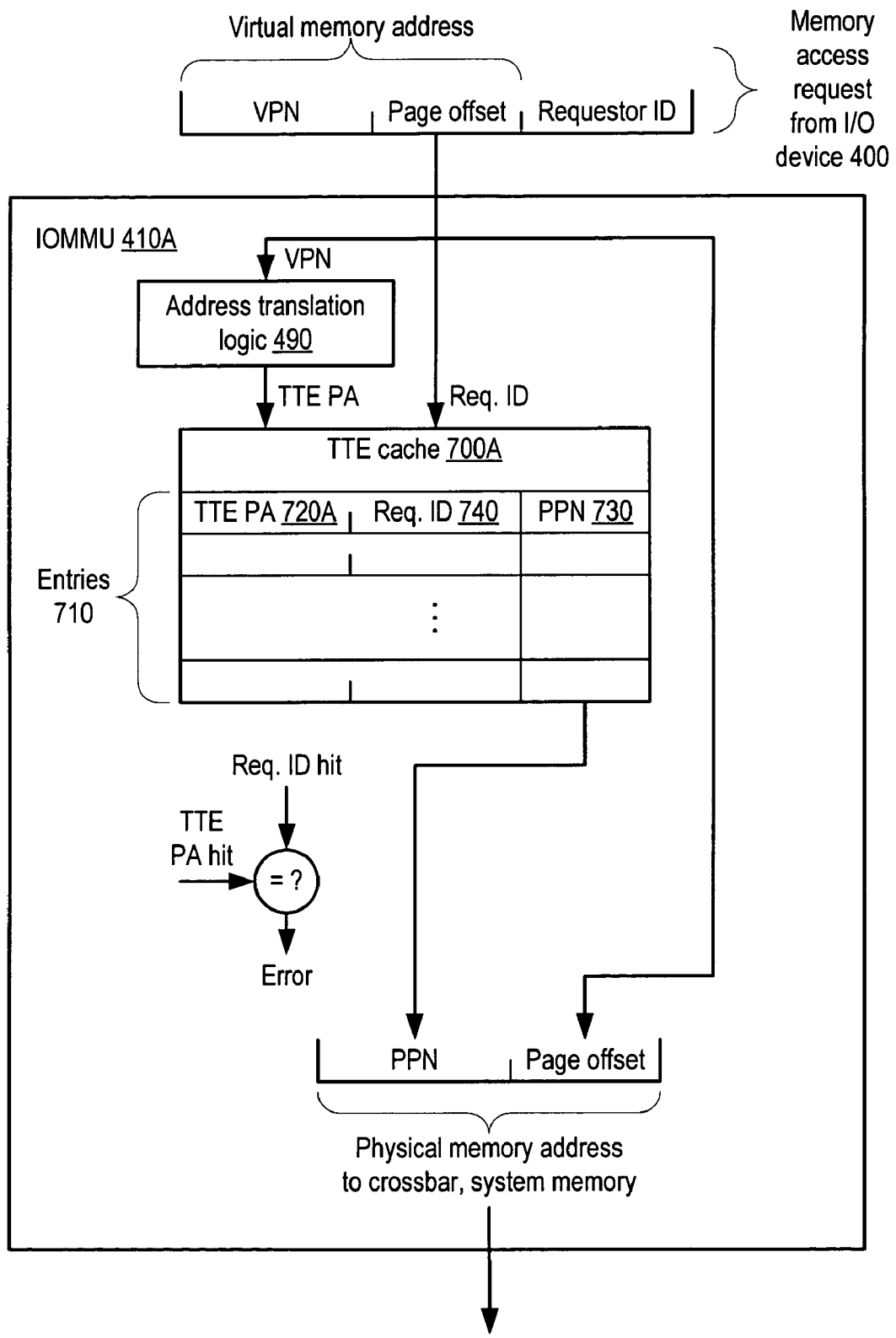

Once a TTE PA is obtained, it may be used to access a TTE cache to determine whether a corresponding PPN has been cached. FIGS. 10A and 10B illustrate embodiments of IOMMU 410A that respectively include TTE cache embodiments 500A and 700A. In the illustrated embodiments, IOMMU 410A and TTE caches 500A and 700A may be similar to IOMMU 410 and TTE caches 500 and 700 described in detail above. However, as shown, IOMMU 410A additionally includes address translation logic 490, which may be configured to determine the physical address of a TTE corresponding to a given virtually-addressed memory access request, for example according to the method of FIG. 9 discussed above. Additionally, individual entries of TTE caches 500A and 700A may respectively include TTE PA fields 520A and 720A in place of VPN fields 520 and 720. Generally speaking, TTE caches 500A and 700A may operate similarly to TTE caches 500 and 700 as described above, with the exception that determining whether a translation corresponding to a memory access request resides within TTE caches 500A and 700A may be dependent upon determining the presence of a cache entry matching the TTE PA of the request rather than the VPN of the request.

Alternative Requestor ID Formats

Figure 11A:
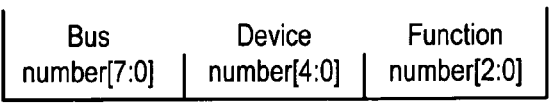
FIGS. 11A and 11B illustrate several exemplary formats of requestor identifiers.
Figure 11B:
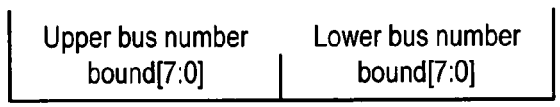

As described above, in one embodiment a requestor ID may be formed from the concatenation of a bus number, device number and function number of a particular device 400. One embodiment of a 16-bit version of such a requestor ID, including 8 bus number bits, 5 device number bits, and 3 function number bits is illustrated in FIG. 11A. During the virtual memory translation process, such a requestor ID may be examined to determine whether it matches a stored requestor ID associated with a translation, as described above. However, other formats of requestor IDs are possible and contemplated. For example, in certain implementations, a device 400 may use some or all of the function number bits for another purpose, such as for indicating the order of certain bus requests or for other "phantom functions." In such an implementation, the function number bits used for phantom functions may not participate in uniquely identifying device 400 and may therefore be excluded from the requestor ID when determining whether a requestor ID matches a stored value. For example, phantom function bits may be masked from the requestor ID during the matching process depending on additional state information that indicates which function bits are configured as phantom function bits.

In an alternative embodiment, instead of being compared against a requestor ID of the format illustrated in FIG. 1A during the matching process, a requestor ID specified by a device 400 may be tested to determine whether some portion of the requestor ID falls within a specified range. One embodiment of such a range specification that may be stored in a TTE cache as requester ID 540 or 740 is illustrated in FIG. 1B. In the illustrated embodiment, two 8-bit bus numbers are provided as a upper bound and a lower bound. A given requestor ID received from a device 400 may be deemed to match if the bus number of the received requestor ID falls within the numerical range specified by the upper and lower bounds of the stored range. In one such embodiment, the device and function numbers of the received requestor ID may not participate in the matching process.

In certain implementations, a given TTE may be configured to support any of the requestor ID types described above as distinct modes of operation. For example, in one embodiment a TTE may include state information that indicates, for that TTE, whether requestor ID checking is enabled or disabled, and if enabled, whether a received requestor ID is to be compared against a range of values or a particular value. The TTE may additionally include the state information described above that indicates which function number bits are phantom function bits, if any. In some embodiments, TTE state information related to requestor ID operation may be stored in entries of TTE cache 500/500A or 700/700A along with other relevant translation information.

Exemplary System Embodiment

Figure 12:
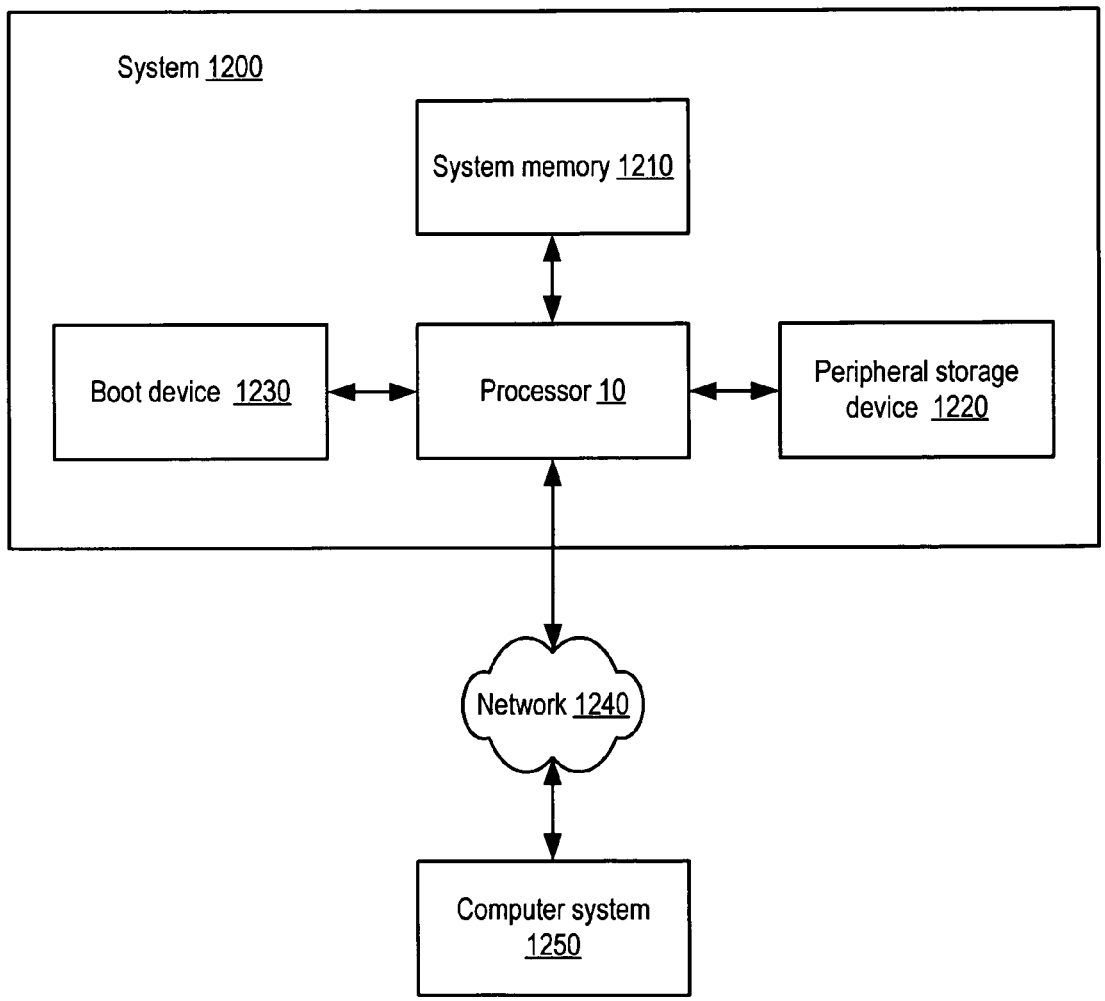
FIG. 12 is a block diagram illustrating one embodiment of a computer system.

As described above, in some embodiments processor 10 of FIG. 1 may be configured to interface with a number of external devices. One embodiment of a system including processor 10 is illustrated in FIG. 12. In the illustrated embodiment, system 1200 includes an instance of processor 10 coupled to a system memory 1210, a peripheral storage device 1220 and a boot device 1230. System 1200 is coupled to a network 1240, which is in turn coupled to another computer system 1250. In some embodiments, system 1200 may include more than one instance of the devices shown, such as more than one processor 10, for example. In various embodiments, system 1200 may be configured as a rack-mountable server system, a standalone system, or in any other suitable form factor. In some embodiments, system 1200 may be configured as a client system rather than a server system.

As noted previously, in various embodiments, system memory 1210 may comprise any suitable type of system memory. Peripheral storage device 1220 may be illustrative of I/O device 400 and in various embodiments may include support for magnetic, optical, or solid-state storage media such as hard drives, optical disks, nonvolatile RAM devices, etc. In some embodiments, peripheral storage device 1220 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1230 may include a device such as an FPGA or ASIC configured to coordinate initialization and boot of processor 10, such as from a power-on reset state. Additionally, in some embodiments boot device 1230 may include a secondary computer system configured to allow access to administrative functions such as debug or test modes of processor 10.

Network 1240 may include any suitable devices, media and/or protocol for interconnecting computer systems, such as wired or wireless Ethernet, for example. In various embodiments, network 1240 may include local area networks (LANs), wide area networks (WANs), telecommunication networks, or other suitable types of networks. In some embodiments, computer system 1250 may be similar to or identical in configuration to illustrated system 1200, whereas in other embodiments, computer system 1250 may be substantially differently configured. For example, computer system 1250 may be a server system, a processor-based client system, a stateless "thin" client system, a mobile device, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor, comprising:
    a device interface configured to receive a memory access request from an input/output (I/O) device, wherein said memory access request specifies a virtual memory address to be accessed and a first requestor identifier (ID) that identifies said I/O device, and wherein said virtual memory address includes a first virtual memory unit identifier; and
    an I/O memory management unit coupled to said device interface and configured to determine whether a virtual-to-physical memory address translation corresponding to said virtual memory address is stored within one of a plurality of entries of an I/O memory translation buffer, wherein said I/O memory management unit is further configured to implement a translation buffer entry replacement policy dependent upon usage history associated with each of said plurality of entries;
    wherein to determine whether said memory address translation is stored within said I/O memory translation buffer, said I/O memory management unit is further configured to determine whether, for any given one of said entries of said I/O memory translation buffer, a second requester ID and a second virtual memory unit identifier, each stored within said given entry of said I/O memory translation buffer, respectively match said first requester ID and said first virtual memory unit identifier specified in said memory access request;
    wherein, in response to determining that both said first and said second virtual memory unit identifier and said first and said second requestor ID respectively match for said given entry, said I/O memory management unit is further configured to indicate a translation buffer hit condition; and
    wherein, in response to determining that for any particular one of said entries, said second virtual memory unit identifier matches said first virtual memory unit identifier and said second requester ID does not match said first requester ID, said I/O memory management unit is configured to disallow said memory access request, to signal an error condition, and to preserve usage history associated with said particular entry without modification.

2. The processor as recited in claim 1, wherein said device interface is compliant with a version of the Peripheral Component Interconnect (PCI), PCI-X or PCI Express (PCI-E) standards.

3. The processor as recited in claim 2, wherein each of said first and second requester IDs respectively includes a PCI bus number, a PCI device number, and a PCI function number.

4. The processor as recited in claim 3, wherein said I/O memory management unit is further configured to mask one or more bits included in said PCI function number such that masked bits do not participate in determining whether said first and said second requester IDs match.

5. The processor as recited in claim 2, wherein said first requester ID includes at least a PCI bus number, wherein said second requester ID includes an upper bus number bound and a lower bus number bound, and wherein to determine whether said second requester ID matches said first requester ID, said I/O memory management unit is further configured to determine whether said PCI bus number falls within a range specified by said upper and said lower bus number bounds.

6. The processor as recited in claim 1, wherein said first and said second virtual memory unit identifiers respectively correspond to a first and a second virtual page number, wherein said I/O memory translation buffer includes a plurality of entries, wherein each entry includes a virtual page number (VPN) field, a physical page number (PPN) field, and a requester ID field, wherein said requestor ID field is configured to store said second requestor ID.

7. The processor as recited in claim 6, wherein to determine whether said virtual-to-physical memory address translation corresponding to said virtual memory address is stored within said I/O memory translation buffer, said I/O memory translation buffer is further configured to determine whether a virtual page number included in said virtual memory address matches a VPN field of a particular one of said plurality of entries.

8. The processor as recited in claim 7, wherein said I/O memory management unit is further configured to determine whether said second requester ID matches said first requester ID specified in said memory access request subsequent to determining that said virtual page number included in said virtual memory address matches said VPN field of said particular entry.

9. The processor as recited in claim 7, wherein to determine whether said virtual-to-physical memory address translation is stored within said I/O memory translation buffer, said I/O memory translation buffer is further configured to determine whether said first requester ID matches said second requester ID stored in said requester ID field of said particular entry.

10. The processor as recited in claim 9, wherein in response to determining that said virtual page number included in said virtual memory address matches said VPN field of said particular entry and that said first requester ID does not match said second requester ID stored in said requester ID field of said particular entry, said I/O memory translation buffer is configured to preserve usage history of said particular entry without modification.

11. The processor as recited in claim 1, wherein said I/O memory translation buffer includes a plurality of entries, wherein each entry includes a translation table entry physical address (TTE PA) field, a physical page number (PPN) field, and a requester ID field, wherein said TTE PA field is configured to store a physical address of a translation table entry corresponding to one or more given virtual memory addresses, and wherein said requester ID field is configured to store said second requester ID.

12. The processor as recited in claim 11, wherein to determine whether said virtual-to-physical memory address translation corresponding to said virtual memory address is stored within said I/O memory translation buffer, said I/O memory translation buffer is further configured to generate a translation table entry physical address corresponding to said virtual memory address of said memory access request and to determine whether said translation table entry physical address matches a TTE PA field of a particular one of said plurality of entries.

13. The processor as recited in claim 1, wherein said I/O memory management unit is further configured to determine a particular virtual memory address space within which said virtual memory address is located dependent upon at least a portion of said virtual memory address and at least a portion of a PCI bus number associated with said I/O device, wherein said particular virtual memory address space is included within a plurality of virtual memory address spaces.

14. The processor as recited in claim 13, wherein in response to determining said particular virtual memory address space, said I/O memory management unit is further configured to select a particular one of a plurality of translation table descriptors, wherein each of said translation table descriptors corresponds to a respective translation table and wherein said particular translation table descriptor corresponds to said particular virtual memory address space.

15. The processor as recited in claim 1, further comprising a plurality of processor cores, wherein each of said processor cores is associated with a respective plurality of threads, and wherein each of said processor cores is configured to issue a first instruction from one of said respective plurality of threads during one execution cycle and to issue a second instruction from another one of said respective plurality of threads during a successive execution cycle, and wherein to signal said error condition, said I/O memory management unit is further configured to convey an error interrupt indication to a particular one of said processor cores for processing by a particular one of said respective plurality of threads.

16. The processor as recited in claim 1, wherein to signal said error condition, said I/O memory management unit is further configured to log said first requester ID.

17. The processor as recited in claim 1, wherein in response to determining that no virtual-to-physical memory address translation corresponding to said virtual memory address is stored within an I/O memory translation buffer, said I/O memory management unit is further configured to initiate a reference to one or more translation tables to obtain said virtual-to-physical memory address translation.

18. A method, comprising:
receiving a memory access request from an input/output (I/O) device, wherein said memory access request specifies a virtual memory address to be accessed and a first requestor identifier (ID) that identifies said I/O device, and wherein said virtual memory address includes a first virtual memory unit identifier; and
determining whether a virtual-to-physical memory address translation corresponding to said virtual memory address is stored within one of a plurality of entries of an I/O memory translation buffer, wherein said I/O memory management unit is configured to implement a translation buffer entry replacement policy dependent upon usage history associated with each of said plurality of entries;
wherein said determining whether said memory address translation is stored within said I/O memory translation buffer comprises determining whether, for any given one of said entries of said I/O memory translation buffer, a second requestor ID and a second virtual memory unit identifier, each stored within said given entry of said I/O memory translation buffer, respectively match said first requestor ID and said first virtual memory unit identifier specified in said memory access request;
in response to determining that both said first and said second virtual memory unit identifier and said first and said second requester ID respectively match for said given entry, indicating a translation buffer hit condition; and
in response to determining that for any particular one of said entries, said second virtual memory unit identifier matches said first virtual memory unit identifier and said second requestor ID does not match said first requestor ID, disallowing said memory access request, signaling an error condition, and preserving usage history associated with said particular entry without modification.

19. The method as recited in claim 18, wherein said I/O device is compliant with a version of the Peripheral Component Interconnect (PCI), PCI-X or PCI Express (PCI-E) standards.

20. The method as recited in claim 19, wherein each of said first and second requester IDs respectively includes a PCI bus number, a PCI device number, and a PCI function number.

21. The method as recited in claim 19, further comprising masking one or more bits included in said PCI function number such that masked bits do not participate in determining whether said first and said second requestor IDs match.

22. The method as recited in claim 19, wherein said first requestor ID includes at least a PCI bus number, wherein said second requestor ID includes an upper bus number bound and a lower bus number bound, and wherein determining whether said second requester ID matches said first requester ID includes determining whether said PCI bus number falls within a range specified by said upper and said lower bus number bounds.

23. The method as recited in claim 18, wherein said first and said second virtual memory unit identifiers respectively correspond to a first and a second virtual page number, wherein said I/O memory translation buffer includes a plurality of entries, wherein each entry includes a virtual page number (VPN) field, a physical page number (PPN) field, and a requestor ID field, wherein said requestor ID field is configured to store said second requestor ID.

24. The method as recited in claim 23, wherein determining whether said virtual-to-physical memory address translation corresponding to said virtual memory address is stored within said I/O memory translation buffer includes determining whether a virtual page number included in said virtual memory address matches a VPN field of a particular one of said plurality of entries.

25. The method as recited in claim 24, wherein determining whether said second requester ID matches said first requester ID specified in said memory access request is performed subsequent to determining that said virtual page number included in said virtual memory address matches said VPN field of said particular entry.

26. The method as recited in claim 24, wherein determining whether said virtual-to-physical memory address translation is stored within said I/O memory translation buffer additionally includes determining whether said first requester ID matches said second requester ID stored in said requester ID field of said particular entry.

27. The method as recited in claim 26, wherein in response to determining that said virtual page number included in said virtual memory address matches said VPN field of said particular entry and that said first requester ID does not match said second requester ID stored in said requester ID field of said particular entry, said I/O memory translation buffer is configured to preserve usage history of said particular entry without modification.

28. The method as recited in claim 18, wherein said I/O memory translation buffer includes a plurality of entries, wherein each entry includes a translation table entry physical address (TTE PA) field, a physical page number (PPN) field, and a requester ID field, wherein said TTE PA field is configured to store a physical address of a translation table entry corresponding to one or more given virtual memory addresses, and wherein said requester ID field is configured to store said second requester ID.

29. The processor as recited in claim 28, wherein determining whether said virtual-to-physical memory address translation corresponding to said virtual memory address is stored within said I/O memory translation buffer includes said I/O memory translation buffer generating a translation table entry physical address corresponding to said virtual memory address of said memory access request and determining whether said translation table entry physical address matches a TTE PA field of a particular one of said plurality of entries.

30. The method as recited in claim 18, further comprising determining a particular virtual memory address space within which said virtual memory address is located dependent upon at least a portion of said virtual memory address and at least a portion of a PCI bus number associated with said I/O device, wherein said particular virtual memory address space is included within a plurality of virtual memory address spaces.

31. The method as recited in claim 30, further comprising selecting a particular one of a plurality of translation table descriptors in response to determining said particular virtual memory address space, wherein each of said translation table descriptors corresponds to a respective translation table and wherein said particular translation table descriptor corresponds to said particular virtual memory address space.

32. The method as recited in claim 18, wherein signaling said error condition includes conveying an error interrupt indication to a particular one of a plurality of processor cores, wherein each of said processor cores is associated with a respective plurality of threads, and wherein each of said processor cores is configured to issue a first instruction from one of said respective plurality of threads during one execution cycle and to issue a second instruction from another one of said respective plurality of threads during a successive execution cycle.

33. The method as recited in claim 18, wherein signaling said error condition includes logging said first requester ID.

34. The method as recited in claim 18, further comprising:
in response to determining that no virtual-to-physical memory address translation corresponding to said virtual memory address is stored within an I/O memory translation buffer, said I/O memory management unit is further configured to initiate a reference to one or more translation tables to obtain said virtual-to-physical memory address translation.

35. A system, comprising:
a system memory; and
a processor coupled to said system memory, wherein said processor includes:
a device interface configured to receive a memory access request from an input/output (I/O) device, wherein said memory access request specifies a virtual memory address to be accessed and a first requester identifier (ID) that identifies said I/O device, and wherein said virtual memory address includes a first virtual page number (VPN); and
an I/O memory management unit coupled to said device interface and configured to determine whether a virtual-to-physical memory address translation corresponding to said virtual memory address is stored within one of a plurality of entries of an I/O memory translation buffer, wherein said I/O memory management unit is further configured to implement a translation buffer entry replacement policy dependent upon usage history associated with each of said plurality of entries;
wherein to determine whether said memory address translation is stored within said I/O memory translation buffer, said I/O memory management unit is further configured to determine whether, for any given one of said entries of said I/O memory translation buffer, a second requester ID and a second VPN, each stored within said given entry of said I/O memory translation buffer, respectively match said first requester ID and said first VPN specified in said memory access request;
wherein, in response to determining that both said first and said second VPN and said first and said second requester ID respectively match for said given entry, said I/O memory management unit is further configured to indicate a translation buffer hit condition; and
wherein, in response to determining that for any particular one of said entries, said second VPN matches said first VPN and said second requester ID does not match said first requester ID, said I/O memory management unit is configured to disallow said memory access request, to signal an error condition, and to preserve usage history associated with said particular entry without modification.

36. The system as recited in claim 35, wherein the processor further includes a plurality of processor cores, wherein each of said processor cores is associated with a respective plurality of threads, and wherein each of said processor cores is configured to issue a first instruction from one of said respective plurality of threads during one execution cycle and to issue a second instruction from another one of said respective plurality of threads during a successive execution cycle, and wherein to signal said error condition, said I/O memory management unit is further configured to convey an error interrupt indication to a particular one of said processor cores for processing by a particular one of said respective plurality of threads.

* * * * *